Fig. 1

INVENTOR.
Victor J. Sigoda
BY Jacob J. Bobrow

Jan. 7, 1964 V. J. SIGODA 3,116,706
ATTACHMENT FOR OVEREDGING
Original Filed May 31, 1955 7 Sheets-Sheet 2

INVENTOR.
Victor J. Sigoda
BY

INVENTOR.
Victor J. Sigoda
BY Jacob J. Bobrow

Jan. 7, 1964  V. J. SIGODA  3,116,706
ATTACHMENT FOR OVEREDGING
Original Filed May 31, 1955  7 Sheets-Sheet 4

INVENTOR.
Victor J. Sigoda
BY
Jacob J. Bobrov

V. J. SIGODA 3,116,706

ATTACHMENT FOR OVEREDGING

Original Filed May 31, 1955

INVENTOR.
Victor J. Sigoda
BY
Jacob J. Bobrow

INVENTOR.
Victor J. Sigoda

United States Patent Office 3,116,706
Patented Jan. 7, 1964

3,116,706
ATTACHMENT FOR OVEREDGING
Victor J. Sigoda, Great Neck, N.Y., assignor to Man-Sew Corporation, New York, N.Y., a corporation of New York
Original application May 31, 1955, Ser. No. 511,933, now Patent No. 2,973,731, dated Mar. 7, 1961. Divided and this application June 15, 1959, Ser. No. 820,492
5 Claims. (Cl. 112—162)

This invention relates to sewing machines for producing overedge seams and more particularly to an attachment which can be mounted on conventional single needle sewing machines of either the lockstitch or chainstitch types to convert such machines for the production of overedging.

Because a large number of single needle lockstitch and chainstitch machines are already in use, a significant advantage can be realized by the conversion of such machines for the making of overedge seams. The invention as shown in the form of an attachment for such machines offers inherent economic benefits resulting from the greater utilization of such existing machines. It will be appreciated, particularly by those versed in the art, that the principles disclosed may also be applied to the design of complete sewing machines manufactured initially to produce overedge seams. It is to be understood therefore that the disclosure is to be taken by way of illustration of the principles of the invention and not in limitation thereof.

Accordingly, it is an object to provide a device which may be attached to a standard industrial type sewing machine with only minor modification to achieve an overedge seaming machine. It is a further object to indicate how the same principles may also be applied to the design of new sewing machines capable of producing such stitching.

These objects have been attained by supporting operating mechanism for two loopers which cooperate with the reciprocating needle of the existing machine to form overedge stitching, in a unitary housing which is capable of being mounted on the cloth-plate of a sewing machine, and in an arrangement in which the looper rockshafts may operate on axes which are disposed entirely above the cloth-plate of the sewing machine. This construction permits the device to be made in the form in which it can be attached to existing sewing machines and accordingly makes possible the manufacture of overseaming machines more economically than heretofore.

Such a unitary construction makes possible a relatively compact addition to various factory type sewing machines which may be mounted on the cloth-plate under the machine arm with a minimum of obstruction to the passage of the work. By using the same housing as an oil reservoir, adequate lubrication for high speed operation is available.

The use of a housing which mounts entirely above the cloth-plate with operating mechanism for thread carrying loopers operating from above the cloth-plate, requires some provision for passing at least one of the loopers through the throat-plate and beneath the working surface of the feed dog so that that looper may coact with the reciprocating needle below the throat-plate. Accordingly, the throat-plate has been provided with an opening through which the looper may pass and the feed dog has been provided with lateral or transverse clearance beneath its working surface. In the feed dog version shown, this clearance is provided by a rectangular opening beneath the working surface of the feed dog which forms an internal passageway. It is possible also to utilize a two part feed dog arrangement such as is found in differential feed type sewing machines in which provision for lateral clearance beneath the working surface has been made by suitable modification.

Since a precut edge on the work is an aid in producing neat and uniform overedging, it has been a further object to provide the device with means for trimming the free edge of the work in advance of the overseaming. This is accomplished by incorporating a cutting mechanism and by operating it from the looper operating drive means.

Because the housing is mounted entirely above the cloth-plate, a form of looper is required which can be rocked from above the cloth-plate and through the throat-plate and beneath the working surface of the feed dog to cooperate with the needle below the throat-plate. It has therefore been an object to provide a looper construction which meets these requirements and this has been done by a two-piece looper construction of novel configuration.

This application is a division of my co-pending case covering a dual stitching machine, Serial No. 511,933, filed May 31, 1955, now Patent No. 2,973,731. The drawings are the same in both cases. The lockstitch instrumentalities shown in the drawings should however be disregarded for the purpose of comprehending the disclosure of the invention as defined in the claims herein. It is readily apparent that if the lockstitch instrumentality of the earlier application be inactivated as by removal of the lockstitch needle, or by leaving that needle unthreaded, etc., that the remaining active stitchforming mechanisms will then function to produce an overedge seam in accordance with this disclosure.

Other features and attendant advantages will appear from the following detailed description and from the drawings of one of the preferred embodiments of the invention. It is to be understood however that the following is to be taken by way of illustration of the principles of the invention and not in limitation thereof.

*The Sewing Machine*

An embodiment of the invention is shown in the form of an attachment applied to an industrial sewing machine of the lockstitch type of the class generally known as the Singer 400W. Such machines have been disclosed in various U.S. patents to Sidney Zonis, typically as in Patent No. 2,267,581 of December 23, 1941. It should be understood however that with appropriate modification the invention may be as readily incorporated into other lockstitch machines of the same manufacture as well as into such machines of other manufacture. If desired, the invention may also be applied to single needle chainstitch machines such as the Singer 400W10 class.

The machine shown consists of a cloth-plate 1, from one end of which rises the standard 2 of a hollow bracket-arm 3 overhanging the cloth-plate and terminating at its free end in a head 4. Rotatably journalled in the bracket-arm 3 is a horizontally disposed main actuating shaft (not shown) carrying at one end a belt-pulley 5. Within the bracket-arm 3, the main-shaft carries a peripherally grooved pulley (not shown, but similar to pulley 8), connected by a clip-belt 6 disposed within the arm-standard 2, to a grooved pulley 8 carried by one end of a loop-taker and feed-actuating shaft 9 rotating one-to-one with the mainshaft and disposed below the cloth-plate 1 in substantial parallelism therewith.

As disclosed in the Zonis patent, shaft 9 carries an internal gear at its other end, the gear being in mesh with a pinion which is integral with one end of a horizontally disposed loop-taker shaft 10. The ratio of the internal gear and the pinion is such that the pinion turns twice for each rotation of the gear. Secured to the free end of shaft 10 is the rotary loop-taker 11 or as it is more popularly known in the trade, the "hook." Prior to modification, this loop-taker is complemental to the lockstitch needle in the formation of lockstitches. In connection with the conversion of the machine for overedge stitching, the "hook" may be removed completely or the bobbin may be omitted.

The work is advanced by feeding mechanism generally the same in construction as that disclosed in the Zonis patent. Since the feeding mechanism of itself forms no part of the invention herein, it is not further described. Additional details may be obtained from the Zonis patent and from his earlier Patent 2,151,308 of March 21, 1939, mentioned therein. Such feed mechanism produces the usual four motions of the modified feed dog 13 herein, which in conjunction with the presser foot 14 serves to advance the work to the stitchforming instrumentalities.

The stitch-forming mechanism includes drive mechanism for the needle-bar and take-up mechanism. As disclosed in Zonis Patent No. 2,267,581, the needle-bar drive mechanism includes a crank-disk carried by the end of the main actuating shaft. The crank-disk has extending therefrom, a crank-pin which is connected by a link pivotally connected to a vertically reciprocatory needle-bar 15 which carries the needle holder 16 shown in the drawings, but which may be omitted if other modifications are made in the mounting arrangement for the housing of the attachment to adjust for the difference in position of the overedge needle shown to the position which the overedge needle would have if mounted in the needle-bar needle mounting hole.

The take-up mechanism found on the conventional lockstitch and chainstitch machines is not required when such machines are converted for overedging.

*The Power Take-Off Gear Unit*

Within the lower end of arm-standard 2, a bracket member 20 is securely fixed to the cloth-plate 1. At its upper end, bracket 20 is formed with an elongated bearing 21 for a drive-shaft 22, both the bearing and the drive shaft extending through an opening in the wall of the arm-standard 2.

To the end of drive-shaft 22 within the arm-standard, gear 23 is fixed and is in mesh with one section 24 of a compound gear 24—25 journalled on a stud shaft fixed in the bracket. Below compound gear 24—25, a second stud shaft is journalled in the bracket and carries a second larger compound gear 26—28, section 26 being in mesh with section 25 of the first compound gear. The relatively large gear section 28 is in mesh with the input drive-gear 29 fixed on one end of shaft 9 adjacent pulley 8. The ratios of the gears and the gear sections have been selected to be one-to-one between the input and output of the gear train so that when power is applied to belt-pulley 5, drive-shaft 22 turns at the same rate of speed as the mainshaft. Shaft 22 is coupled by means of a double universal joint 30 to an output drive-shaft 31 which operates the looper drive mechanisms.

*The Housing for the Looper Drive Mechanisms*

Figures 10, 11, 12, 13:
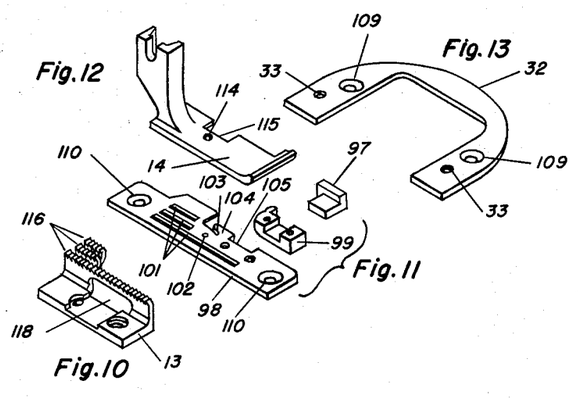
FIG. 10 is a perspective view of the modified feed dog.
FIG. 11 is a perspective view of the needle plate, the stationary cutter blade and the means by which it is secured to the needle plate.
FIG. 12 is a perspective view of the presser foot.
FIG. 13 is a perspective view of the adapter plate which replaces the usual work support or throat-plate and which is mounted in its place in the opening provided therefor so that the mounting place of the device may be screwed thereto to be attached to the cloth-plate.

The usual work support or throat-plate of the machine may be replaced by a cut out adapter plate 32, FIG. 13, having an extra pair of holes 33 threaded to receive screws by means of which the mounting plate 34 for the housing is secured to the cloth-plate of the sewing machine. Plate 34 carries attached thereto, an L-shaped housing 35 which contains the drive mechanisms for operating the loopers, a thread control member and the cutter mechanism.

Housing 35 is a one-piece, oil-tight casting, and when the unit is first assembled, a gasketed cover plate 36 is screwed to the top of the housing and sufficient oil introduced through oil-cup 38 to cover the working parts to provide lubrication during operation.

Figure 3:
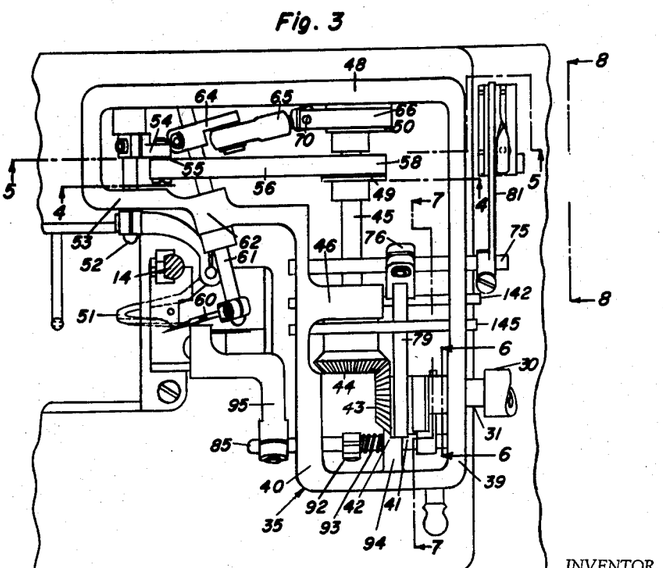
FIG. 3 is a top plan view of the overseaming mechanism as applied to the machine, part of the machine, and more specifically the needle bar and the needle having been omitted so that the loopers are more clearly visible.
Figure 6:
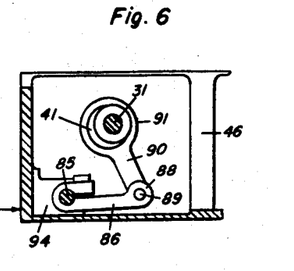
Figure 7:
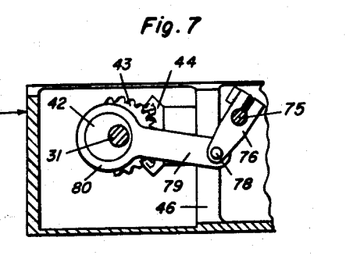
Figure 8:
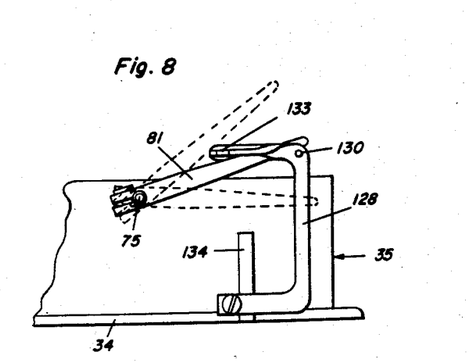
FIG. 8 is a fragmentary view taken mainly on line 8—8 of FIG. 3 showing the thread control lever for the primary looper, the extremes of position being shown in broken line, and also showing the thread guides on opposite sides of the lever.

Referring now to FIGS. 3, 6 and 7, in the end of the housing 35 nearest the machine operator, drive-shaft 31 is journalled in an anti-friction bearing mounted in wall 39. A first eccentric 41 is secured to shaft 31 and is rotated thereby to operate a cutter operating mechanism to be subsequently described. A second eccentric 42 and a spiral miter gear 43 are also secured to shaft 31. Eccentric 42 operates the thread control member for the primary looper. Gear 43 drives the looper operating mechanisms.

*Operating Mechanisms for the Thread Loopers*

A mating spiral gear 44 in mesh with gear 43 is carried on one end of shaft 45 journalled in anti-friction bearings mounted in the short cross-wall 46 and the rear wall 48 of housing 35. Shaft 45 carries two eccentrics 49 and 50 which respectively operate the primary and secondary loopers.

Figure 4:
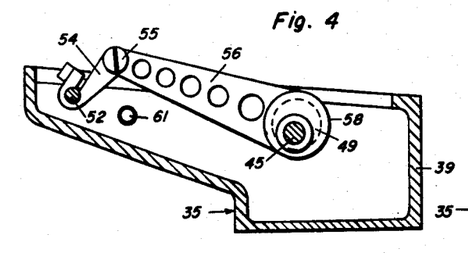
FIGS. 4, 5, 6 and 7 are sectional detail views taken respectively on lines 4—4, 5—5, 6—6 and 7—7 of FIG. 3, certain mechanism having been omitted in each for clarity.
Figure 5:
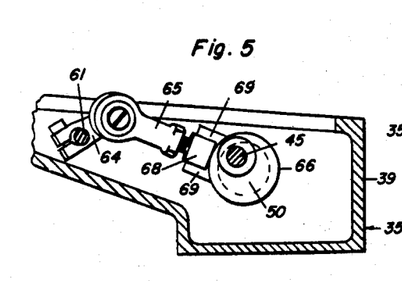

Primary looper 51 is oscillated by looper-shaft 52 journalled in bearings in back wall 48 and in the long cross-wall 53. Referring now to FIGS. 3 and 4, shaft 52 is rocked through a linkage which consists of a short-arm 54 clamped on shaft 52 which is pivotally connected at 55 with an eccentric-arm 56, one portion of which is a strap 58 encircling eccentric 49. Secondary looper 60 is oscillated by an obliquely disposed looper-shaft 61 journalled in bearings in back wall 48 and in an obliquely offset joggle 62 in cross-wall 53. Referring now to FIGS. 3 and 5, shaft 61 is rocked by a linkage which includes short-arm 64 joined to the universally movable ball of a ball-joint rod end bearing 65. A strap 66 which encircles eccentric 50 is connected to the rod end bearing 65 by the threaded shank of a T-block 68, the threaded shank being received within a threaded socket of the rod end bearing. The head of T-block 68 is pivotally mounted between the arms 69 of strap 66 by transverse pin 70.

This flexible linkage permits the rocking of shaft 61 from eccentric 50 even though shafts 45 and 61 are obliquely disposed to each other, the ball-joint and the pivotal mounting of the T-block permitting transmission, without binding, of the lateral movement developed by the rotation of eccentric 50 in strap 66.

*Operating Mechanism for the Thread Control Lever*

Operating shaft 75 for the thread control lever is journalled in bearings in walls 39 and 40 rearwardly of drive-shaft 31 and somewhat above shaft 45. Referring now to FIGS. 3 and 7, a short-arm 76 is clamped to shaft 75 and the end of arm 76 is pivotally connected at 78 with eccentric-arm 79, having a strap portion 80 which encircles eccentric 42. Externally of the housing 35, shaft 75 carries, adjacent wall 39, a thread control lever 81 which is concerned with the control of the thread handled by the primary looper 51.

"Thread control" as used herein relates to the take-up of excess thread occurring during a portion of the looper movement in the course of the stitch formation and also to the pull-down of additional thread from the thread supply during another portion of the stitching cycle to provide enough thread for subsequent action by the looper.

*Operating Mechanism for the Cutter Mechanism*

Cutter operating shaft 85 is journalled in bearings in walls 39 and 40 forwardly of drive-shaft 31 and somewhat below it. Shaft 85 is rocked about its axis by a linkage which connects it with eccentric 41. Referring now to FIGS. 3 and 6, this linkage includes a lever 86 which is clamped to shaft 85 at one end and which is provided with a Y-shaped yoke or clevis 88 at its other end. A pin 89 held between the two arms of the Y-shaped yoke or clevis 88 is freely received in a bore at one end of a downwardly depending eccentric-link 90. The upper end of link 90 is formed into a strap 91 which encircles eccentric 41.

The space between the two parallel arms of clevis 88 is wide enough to permit shaft 85 to be shifted axially without affecting the transmission of the rocking motion from eccentric-link 90 to lever 86. This provision for axial adjustment is made because it is necessary to adjust the shearing contact of the cutter members initially and subsequently after wear takes place. Shifting of shaft 85 is effected by first loosening the set screw of clamp-bushing 92, adjusting the position of shaft 85 until the mating cutters are in proper engagement, and then resetting clamp-bushing 92 against the tension of spring 93 coiled about shaft 85 and which is held between clamp-bushing 92 and the short-wall 94.

Figure 2:
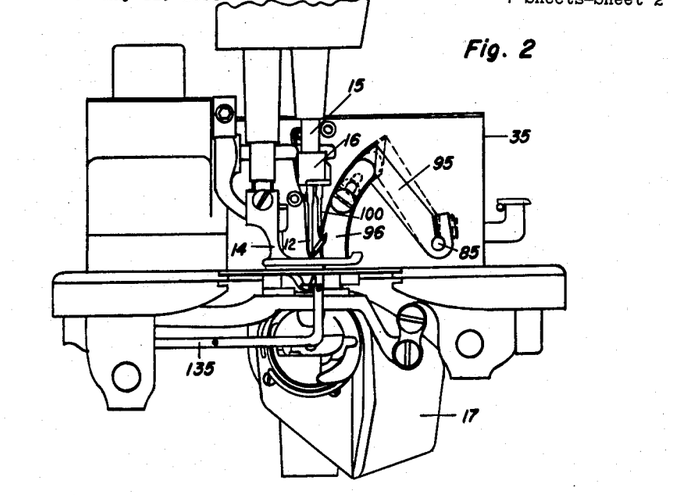
FIG. 2 is an end elevational view of the machine shown in FIG. 1, the top part of the machine having been omitted, to show the device as viewed from the needle end of the machine.
Figure 14:
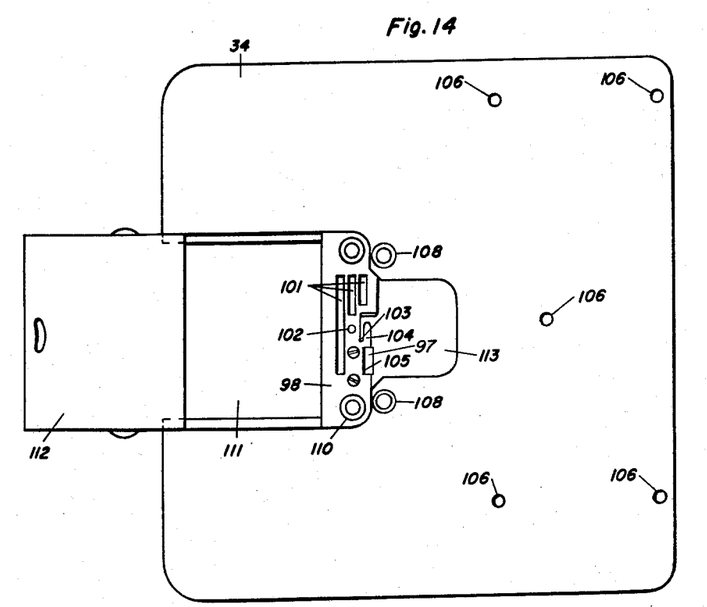
FIG. 14 is a plan view of the mounting plate by means of which the overseaming mechanism is secured to the cloth-plate showing the slide plate displaced and with the needle plate and stationary cutter blade placed in position thereon but not screwed thereto.

Referring now to FIG. 2, externally of the housing, adjacent wall 40, cutter operating shaft 85 carries movable cutter member 95, provided at its lower extremity with a cutter blade 96 which engages a mating stationary cutter blade 97 (see FIG. 11) which may be made integral with the needle-plate 98 or may be secured thereto as shown in FIGS. 11 and 14 by means of clamp-block 99 and screws passing through the needle-plate and threaded into the clamp-block.

Figure 1:
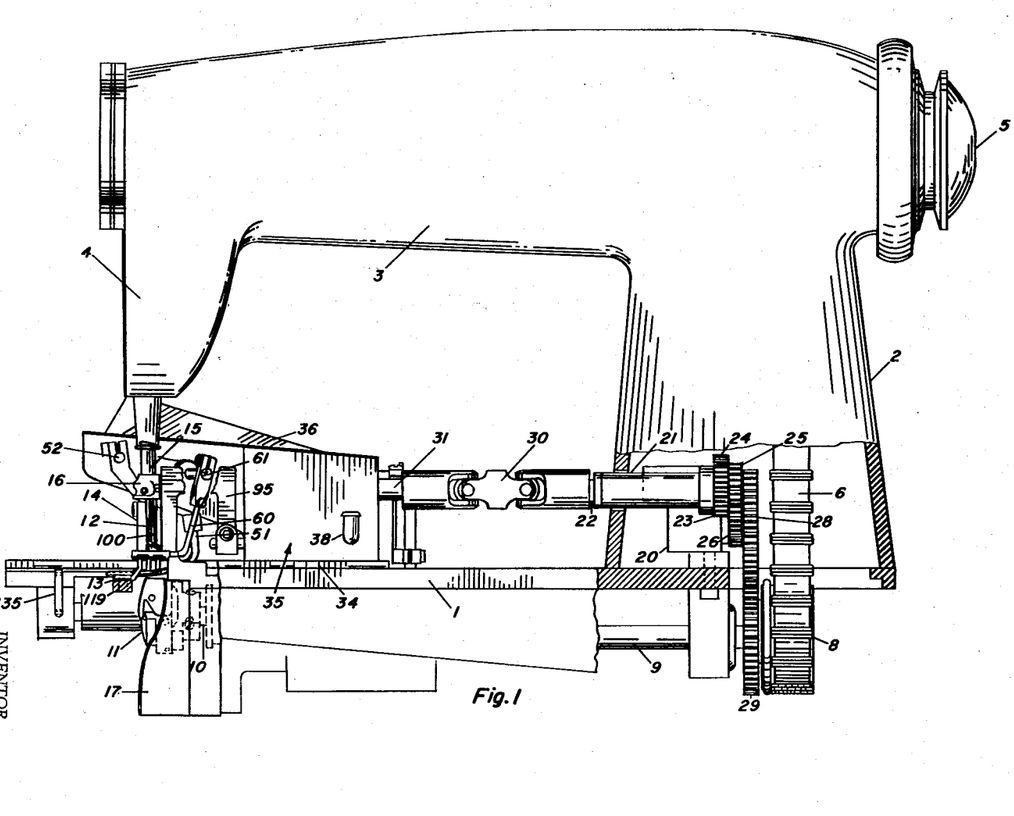
FIG. 1 is a front elevational view of a high speed lockstitch machine to which the invention has been applied, part of the machine standard having been broken away to show the power take-off gear drive mechanism through which the overseaming mechanism is operated from the "hook" actuating shaft and another part of the machine having been broken away to show the operating relationship of the needle and the loopers.
Figure 9:
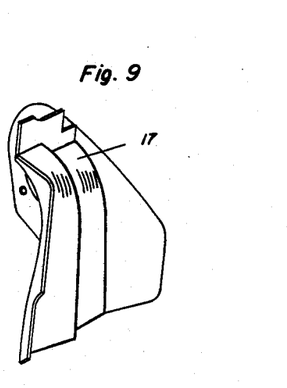
FIG. 9 is a perspective view of the cloth chip guard which deflects the cuttings from the operating mechanism beneath the cloth-plate and prevents fouling thereof.
Figure 15:
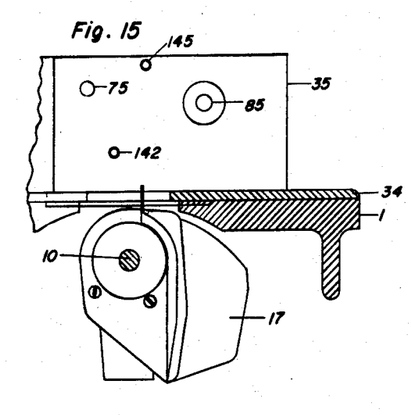
FIG. 15 is a fragmentary sectional view taken from the same point as FIG. 2, but with many parts omitted to show how the chip guard is mounted in place.

Operation of the cutter mechanism produces cuttings and cloth chips which if not deflected would foul the operating mechanism beneath the cloth-plate. A chip guard or shield 17 serves to prevent such fouling and tends to keep the clippings from other parts of the machine as well. Chip guard 17 is formed as indicated in FIG. 9, and is shown in position in FIGS. 1, 2 and 15.

*The Needle-Bar, Needle and Needle-Plate*

Referring now to FIG. 2, needle-bar 15 may be fitted at its lower end with a needle clamp member 16 in which the overedge needle 100 may be held. Viewing the machine as in FIG. 1, the overedge needle is shown disposed to the right of the position which the usual machine needle would occupy. As previously mentioned, rearrangement of mounting plate 34 and of needle-plate 98 would permit this overedge needle to be mounted centrally in the usual needle hole of needle-bar 15.

As shown in FIGS. 11 and 14, needle-plate 98 is provided with slots 101 for the runners of the feed dog 13, and a needle hole 103 for the overedge needle 100. The slot running from hole 103 separates stitch tongue 104 from the rest of the needle-plate. This tongue serves to support the edge of the work during the formation of the overedge stitching and is tapered on its under side toward the rear of the machine to facilitate pulling off of the formed overedge stitching as the feed moves the work rearwardly. The needle-plate is also provided with a rectangular notch 105 in which stationary cutter blade 97 is received.

*The Mounting, Slide and Adapter Plates*

Referring to FIG. 14, mounting plate 34 is provided with a series of openings 106, countersunk on the under side of the plate, for flat-head screws which are threaded into corresponding openings in the undersurface of housing 35 to secure them together. Plate 34 is mounted on cloth-plate 1 by flat-head screws which pass through openings 108 in the mounting plate and corresponding openings 109 in adapter plate 32 and are threaded into tapped throat-plate screw holes on the machine.

The needle-plate is secured in position on the mounting plate and the machine by flat-head screws which pass through countersunk openings 110 in needle-plate 98 and corresponding clearance holes (not shown) in the mounting plate and are threaded into tapped holes 33 of the adapter plate 32. As mentioned previously, adapter plate 32 replaces the usual work support or throat-plate of the sewing machine, or optionally may be completely omitted.

The mounting plate is cut out at 111 and provided with rabbets in which slide plate 112 is slidably fitted. Plate 112 permits access to the underpart of the machine and the threading of primary looper 51. A second cut out at 113 in mounting plate 34 provides clearance for both loopers as they operate in the course of the formation of the overedge stitching. Opening 113 also provides clearance for the downward movement of movable cutter blade 96 and passage for the scraps of material trimmed from the edge of the work just prior to the formation of the overedge stitch.

The Presser Foot and Feed Dog

Referring now to FIG. 12, presser foot 14 is provided with a rectangular notch 115 in register with the stitch tongue 104 on the needle-plate below. This notch provides clearance for passage of the overedge needle and for the movement of the secondary looper as it passes upwardly across the edge of the work to present its thread loops to the needle for interception (see FIG. 3).

Figures 16, 18, 19:
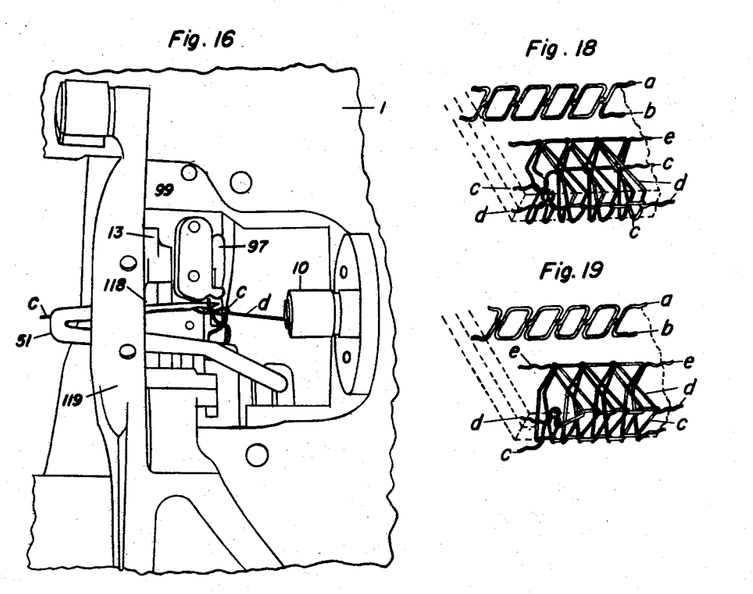
FIG. 16 is a bottom view of a portion of the sewing machine showing the primary looper and how it transversely clears the feed dog.
FIG. 18 is an enlarged representation of the overedge seam formed by the device when mounted on the sewing machine, the thread tensions having been adjusted to produce stitching identified in the "Federal specification for stitches, seams and stitching" as type 504.
FIG. 19 is a similar view, the thread tensions having been adjusted to produce overseaming stitching of type 505.
Figure 17:
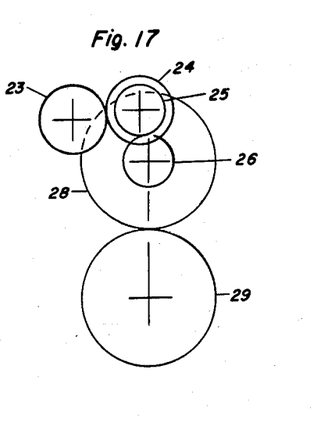
FIG. 17 is a diagrammatic representation of the power take-off gear drive unit as seen from the handwheel end of the sewing machine.

As may be seen from FIG. 16, feed-dog 13 is mounted on a feed-bar 119 whose compound movements provide the well known four motion feed action of the feed-dog. As seen in FIG. 10, the feed-dog generally resembles the conventional feed-dog except that it is suitably modified to permit lateral clearance for looper 51. Such clearance may be provided, as for example, by an internal passageway such as rectangular opening 118, under the feeding or work surface of the feed-dog. It is through such an opening that primary looper 51 passes during its leftward traverse to meet the needle 100 (viewing the machine as in FIG. 1). The extreme of this lateral movement is indicated in FIGS. 3 and 16.

The Primary Looper

Figure 20:
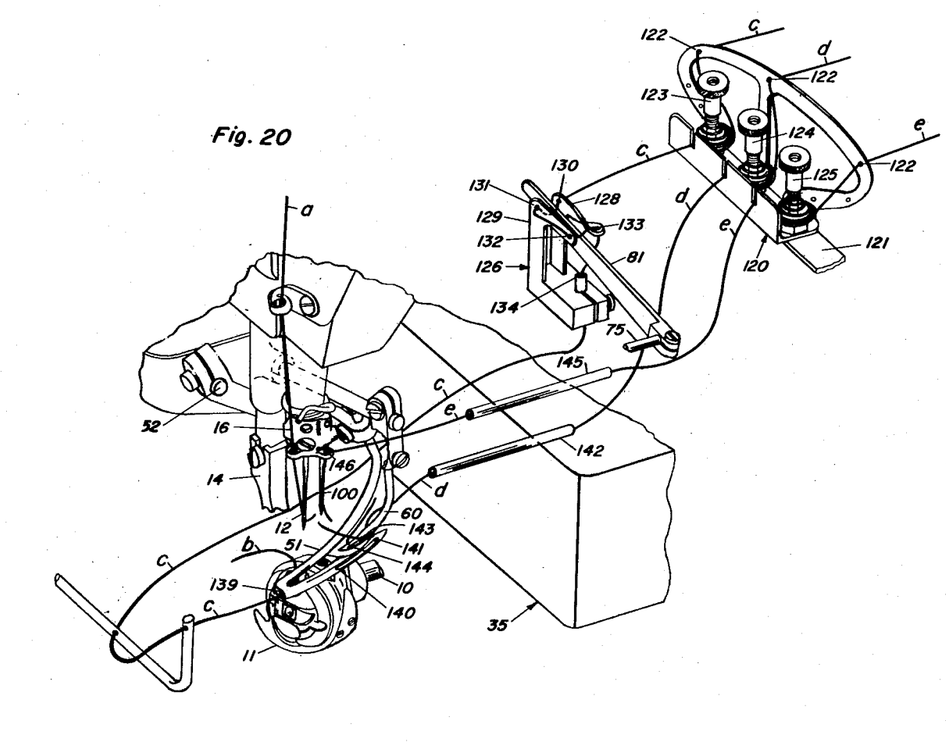
FIG. 20 is a diagrammatic perspective view showing the thread for the overedge stitching.
Figure 21:
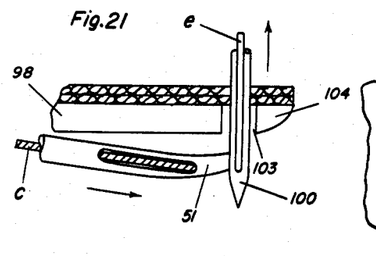
FIG. 21 is a detail view showing the beginning of the formation of the overedge stitching, the point of the primary looper having just intercepted the thread loop of its complementary needle.

Primary looper 51 is preferably of two element construction for ease and economy in manufacture. As best seen in FIG. 20, one element consists of a downwardly and laterally extending arm provided with clamp portions on either end. The upper clamp portion permits the primary looper to be mounted on shaft 52 with provision for both axial and radial adjustment as required for proper coaction with the overedge needle 100. The lower clamp portion supports the second, c thread carrying element which is pointed so that it can intercept the needle thread loops formed of the e thread after the needle enters the work. This latter element consists of a downwardly disposed support section or portion (as viewed in FIG. 20) from which another portion extends downwardly and laterally to a junction from which the displaced or offset thread carrying and engaging pointed section or portion extends laterally in a reverse direction. The last named sections are arcuately curved and have substantially the same radius centered about the axis of oscillation or rotation of shaft 52. It is apparent, that if desired, an alternate single piece form of construction might be utilized with portions shaped and disposed as described.

Thread Handling

Since the overedge stitching shown herein involves three threads c, d and e, a triple tension assembly 120 is mounted on a bracket 121 secured either to the back of the machine or in any other suitable location. The thread supply (not shown) consists of a stand on which spools of thread are supported, and the threads therefrom are passed through openings 122 and under the tension plates of the individual tension devices 123, 124 and 125, which are provided with tension springs and thumbnuts for individual adjustment of the tension of each thread.

The thread c for the primary looper 51 passes from tension device 123 to a thread control device 126 which has a pair of arms 128 and 129 pierced with a series of thread guide holes 130, 131, 132 and 133, through which the thread c passes in sequence. In passing from hole 130 to hole 131, the thread c passes under thread control lever 81 and in passing from hole 132 to hole 133, it passes over lever 81. Hence as lever 81 moves downwardly, additional thread will be drawn through tension device 123 from the thread supply, and as lever 81 moves upwardly, any slack in the thread c leading to the looper 51 will be taken up. The extent of downward and upward movement of lever 81 depends on the position of lever 81 on its rockshaft 75 and this may be adjusted either by resetting the lockscrew in its clamp portion on shaft 75 or by resetting the position of arm 76 on shaft 75.

The primary looper thread c passes from hole 133 downwardly through tube 134 and under the bed of the machine to a bent thread guide rod 135, passing in turn through openings 136 and 138 therein and into opening 139 in looper 51 and then through a central passage therein to opening 140 from which it emerges to lie in a longitudinal thread groove leading to and through eye 141 through which thread c passes to the back of the looper. In FIG. 16, thread c is seen leaving eye 141 and looped around thread d of the secondary looper which has been completely withdrawn to the right.

Thread d for the secondary looper 60 passes from tension device 124 through the lower thread guide tube 142 which is transversely mounted in housing 35 between walls 39 and 40. Thread d then enters an opening 143 running from the back to the front of looper 60 and then passes along a longitudinal thread groove which terminates in eye 144 near the point of looper 60. Thread d passes through eye 144 to the back of the looper.

Thread e for needle 100 runs from tension device 125 through upper thread guide tube 145 which is also mounted transversely in housing 35 between walls 39 and 40. It then enters the thread guide opening 146 on needle holder 16 and then passes through the eye of needle 100.

No take-up devices are shown for either thread d or e because they have not been found to be required for production of the stitch types illustrated. However, any take-up action that may be deemed desirable, may be obtained by utilizing thread control lever 81 and the associated thread guides. Additional threads may be passed through any of the holes in arms 128 or 129 to provide either thread pull-down from the spool or take-up of slack.

The difference in the stitches shown in FIGS. 18 and 19 is a matter of adjustment of the individual thread tensions. If the tensions used to produce the stitch of FIG. 18 are taken as references, then to produce the stitch of FIG. 19, the tensions would be adjusted so that the tension device 125 for thread e is lessened; the tension device 123 for thread c is increased; and the tension device 124 for thread d is increased slightly.

Operation

After the threads have been inserted in the needle and the loopers, the various tension devices suitably adjusted, and the work placed under the presser foot, as the machine begins to operate, the edge of the work will first be trimmed by the reciprocation of cutter blade 96 against stationary blade 97 just prior to the formation of the overedge stitching.

Figure 22:
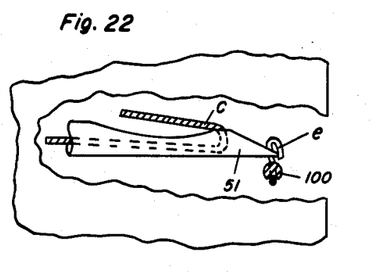
FIG. 22 is a plan view of the structure shown in FIG. 21.
Figure 23:
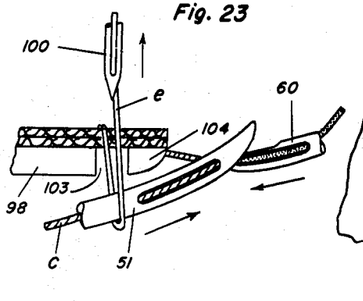
FIG. 23 is a detail view showing a later stage, the primary looper having passed through the needle loop to reach the position at which the point of the secondary looper just intercepts the thread loop carried by the primary looper.

The sequence of steps which occur during the formation of the overedge stitching will be best understood by referring to FIGS. 21 to 26. Needle-bar 15 in descending from its highest position, carries needle 100 through the work and the needle-plate to the lowest position of the needle below the work. As the needle just begins to rise, an e thread loop forms about the eye of the needle. In this interval, looper 51 has been moving from the extreme leftward position shown in FIGS. 3 and 16, and just after this e thread loop forms, the point of looper 51 is in position to intercept this loop (FIG. 22). As looper 51 continues on its arcuate path upwardly and to the right, it passes itself and its own thread through the *e* thread loop, elongating it (FIG. 23).

In passing from the left to the right, the eye of looper 51 is initially below needle-plate 98 but as the extreme of the righthand movement is reached, the arcuate path about which looper 51 is rocked brings the eye of the looper above the needle-plate slightly beyond the position shown in FIG. 23. As looper 51 moves to this extreme rightward point, it reaches a position in which the point of looper 60 can intercept the *c* thread loop formed between the eye of looper 51 and the anchorage of the last stitch in the work (see FIG. 18).

Figure 24:
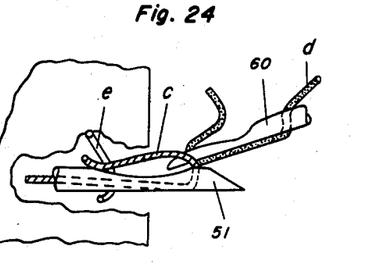
FIG. 24 is a plan view corresponding to FIG. 23.
Figure 25:
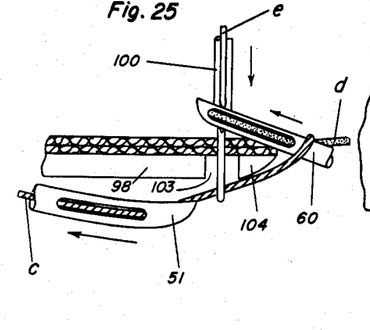
FIG. 25 is a detail view showing the last stage of the overedge stitching formation, the secondary looper having carried the intercepted primary looper thread over the edge of the work and having reached the position in which it presents its own thread loop to the point of the descending needle for interception; the three interceptions in sequence serving to secure the threads together in the work.
Figure 26:
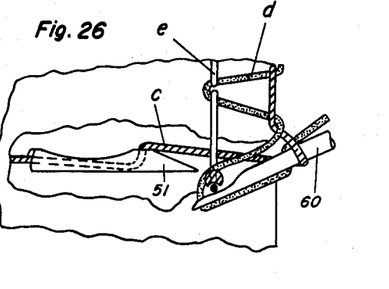
FIG. 26 is a plan view of the structure shown in FIG. 25.

After interception of this loop, looper 60 continues to move on an arcuate path upwardly and to the left from the point of interception and angularly until it reaches a point just forwardly of needle 100 (FIGS. 24, 25 and 26). Previously, needle 100 has reached the uppermost limit of its reciprocation and has begun to descend toward the needle-plate, and just as looper 60 reaches a point where the descending point of the needle can intercept the *d* thread loop running from the eye of looper 60 to the last stitch in the work (see FIG. 18), the needle has descended to be in position to intercept the *d* thread loop above the surface of the work.

As the needle continues its descent through the intercepted *d* thread loop, looper 51 moves toward the left, shedding the preceding *e* thread loop; looper 60 moves to the right, shedding the *c* thread loop; and since the *d* thread loop is caught about needle 100, the three threads are interchained about stitch tongue 104 and the edge of the work. As the needle continues to descend below the needle-plate, looper 51 completes its excursion to the left and returns to the initial position on its passage to the right at which it can again intercept the *e* thread loop, and the cycle repeats continuously during subsequent operation of the sewing machine.

The extent of the rocking of loopers 51 and 60 is governed by the amount of eccentricity incorporated in their respective actuating eccentrics and the linkages. It is therefore a matter of choice just how much rock is produced in oscillating each of these loopers. The interrelation of the rocking is determined by the position of each eccentric on its particular shaft, and provision is made for adjustment of each eccentric by means of set screws so that just the right operating cycle for the loopers may be obtained. This also applies to the operation of the rockshaft for the movable cutter, and these are matters well within the skill of those versed in the art, and require no further elaboration.

Variations and modifications may be made within the scope of the invention without departing from the spirit thereof, and it is to be understood that the invention is not limited to the details of construction shown and described herein, but is to be construed broadly within the purview of the appended claims.

The term "throat-plate" as used in the claims herein is intended to define the work support plate of the sewing machine which is disposed near the needle and the feed members. Herein, the "throat-plate" is a combination of mounting plate 34 and needle-plate 98, it being understood that these plates are manufactured separately for convenience. So much of plate 34 as immediately surrounds opening 113 is in effect that part of the usual throat-plate which this combination replaces. The extension of plate 34 to its full rectangular shape as shown in FIG. 14 is for the purpose of providing the convenience of a mounting plate for the housing as well as a throat-plate replacement in the embodiment shown.

What is claimed is:

1. A looper member for an overedge sewing machine having a curved portion comprising two sections, each of said sections having substantially the same radius of curvature from the axis of oscillation of said looper member when said looper member is mounted on the machine for operation; both of said sections lying approximately in the same cylindrical surface and displaced from each other.

2. A looper member for an overedge sewing machine comprising an arm portion and a thread manipulating portion, said arm portion having means thereon by which it may be secured to a rockshaft for rotation of said looper member; said arm portion being of arcuate shape and disposed in a first lateral direction; said thread manipulating portion being offset from said arm portion and comprising a support section and a thread carrying section; said support section being disposed in a lateral direction generally opposite to the direction of the arm portion; said thread carrying section being joined to said support section but displaced therefrom and disposed in a lateral direction opposite to that of said support section; both of said sections being arcuate in shape, and both of said sections having substantially the same radius of curvature.

3. An overedge sewing machine having a vertically reciprocating threaded needle, a needle-plate having a needle hole and an opening adjacent thereto and a stitch tongue disposed between said needle hole and said opening; a looper operating rockshaft having an axis of oscillation disposed entirely above said needle-plate; a looper member mounted on said rockshaft for oscillation about said axis and for cooperation with said needle; said looper member having a support portion extending downwardly and in a lateral direction away from said rockshaft to and past said stitch tongue, and a thread carrying and thread manipulating portion extending from said support portion through said opening and having two connected curved sections which are offset from each other and extend laterally in opposite directions, said sections having substantially the same radius of curvature centered about the axis of oscillation of said rockshaft.

4. A sewing machine having a threaded needle reciprocating in a vertical path; a cloth-plate; a housing supported upon and projecting upwardly from the cloth-plate; a pair of rockshafts journalled in said housing and having axes of oscillation disposed entirely above the cloth-plate; means within said housing for actuating the rockshafts; a threaded underlooper mounted on one rockshaft; and a thread carrying overedge looper mounted on the other rockshaft; said needle being reciprocated and said loopers being oscillated in timed relationship to form overedge stitching.

5. A sewing machine in accordance with claim 4 in which the path of oscillation of the overedge looper lies in a substantially vertical plane which intersects the path of oscillation of the underlooper and the path of reciprocation of the needle.

References Cited in the file of this patent

UNITED STATES PATENTS

| | | |
|---|---|---|
| 380,047 | Moschcowitz | Mar. 27, 1888 |
| 591,384 | Collins et al. | Oct. 12, 1897 |
| 817,475 | Durand | Apr. 10, 1906 |
| 2,324,861 | Marsac | July 20, 1943 |
| 2,704,042 | Wallenberg et al. | Mar. 15, 1955 |
| 2,733,675 | Pierce | Feb. 7, 1956 |